United States Patent Office 3,310,821
Patented Mar. 28, 1967

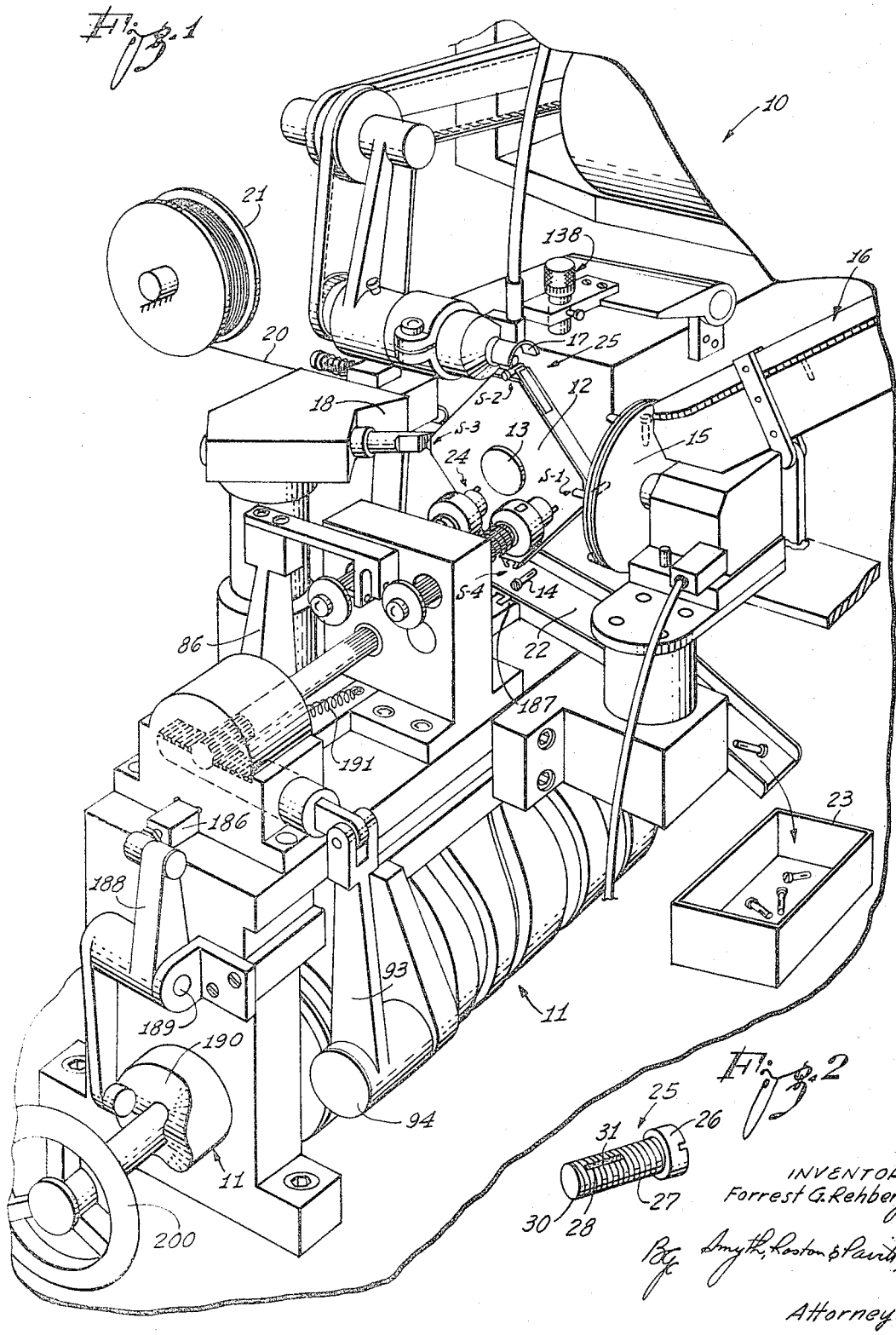

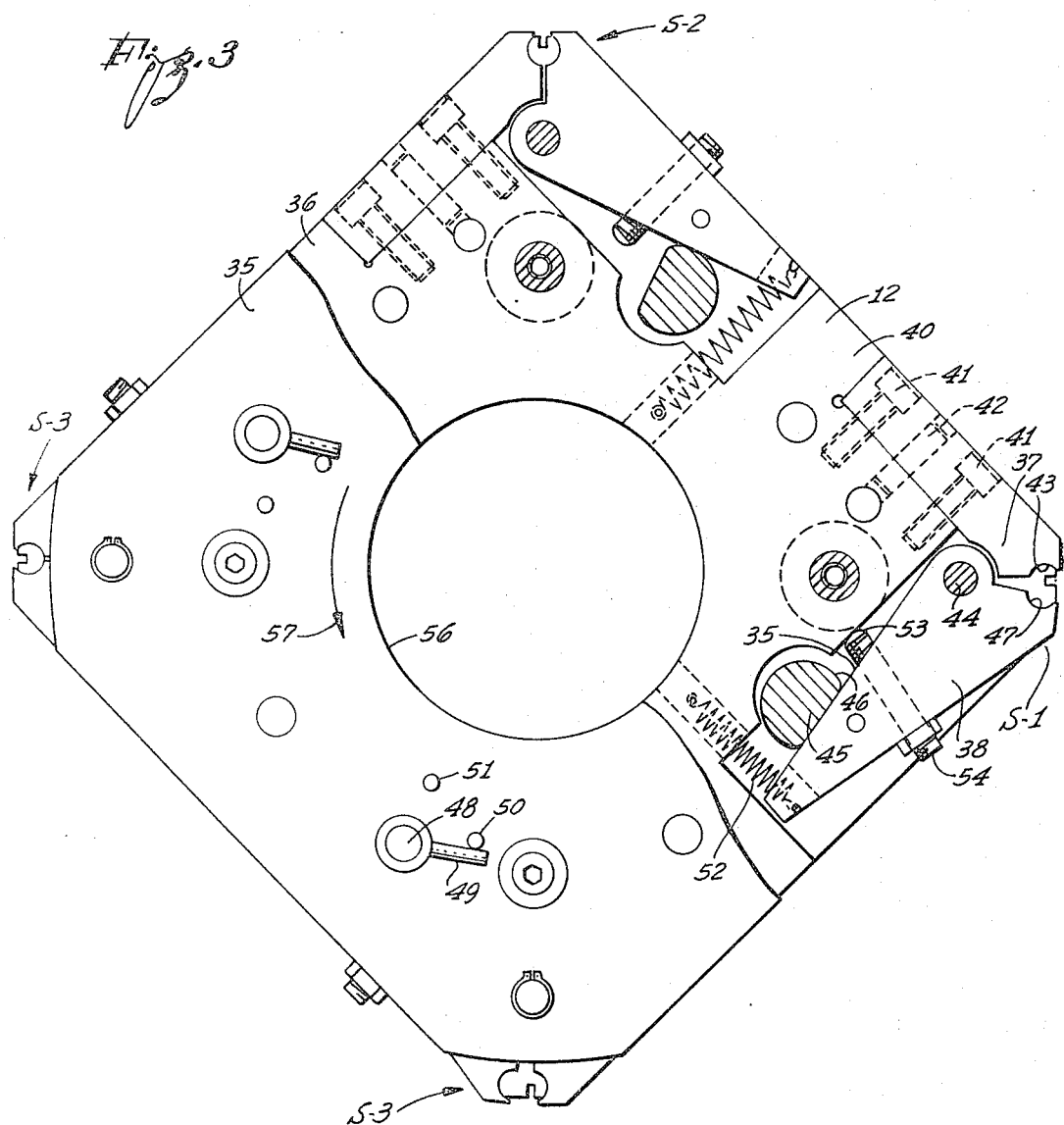

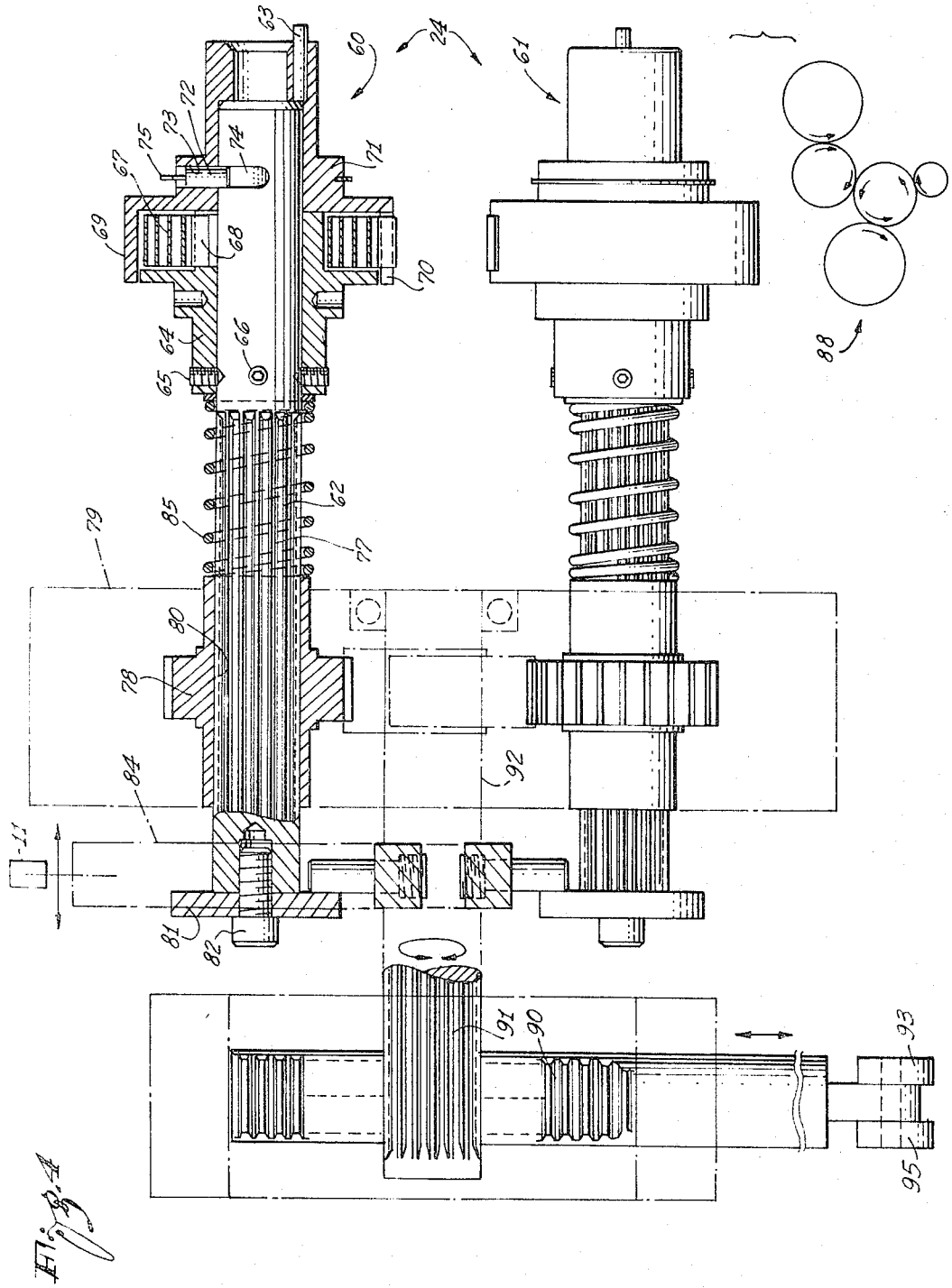

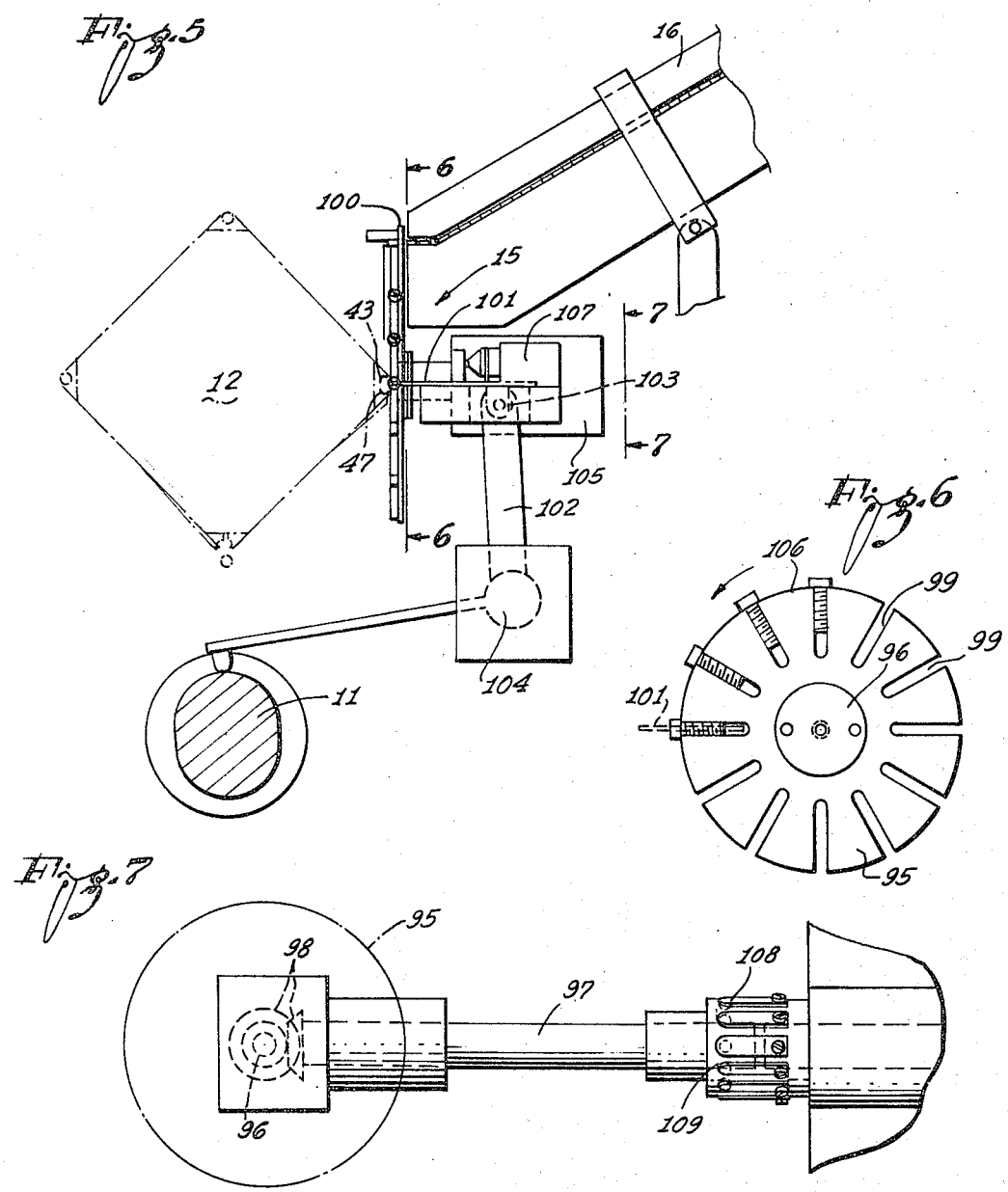

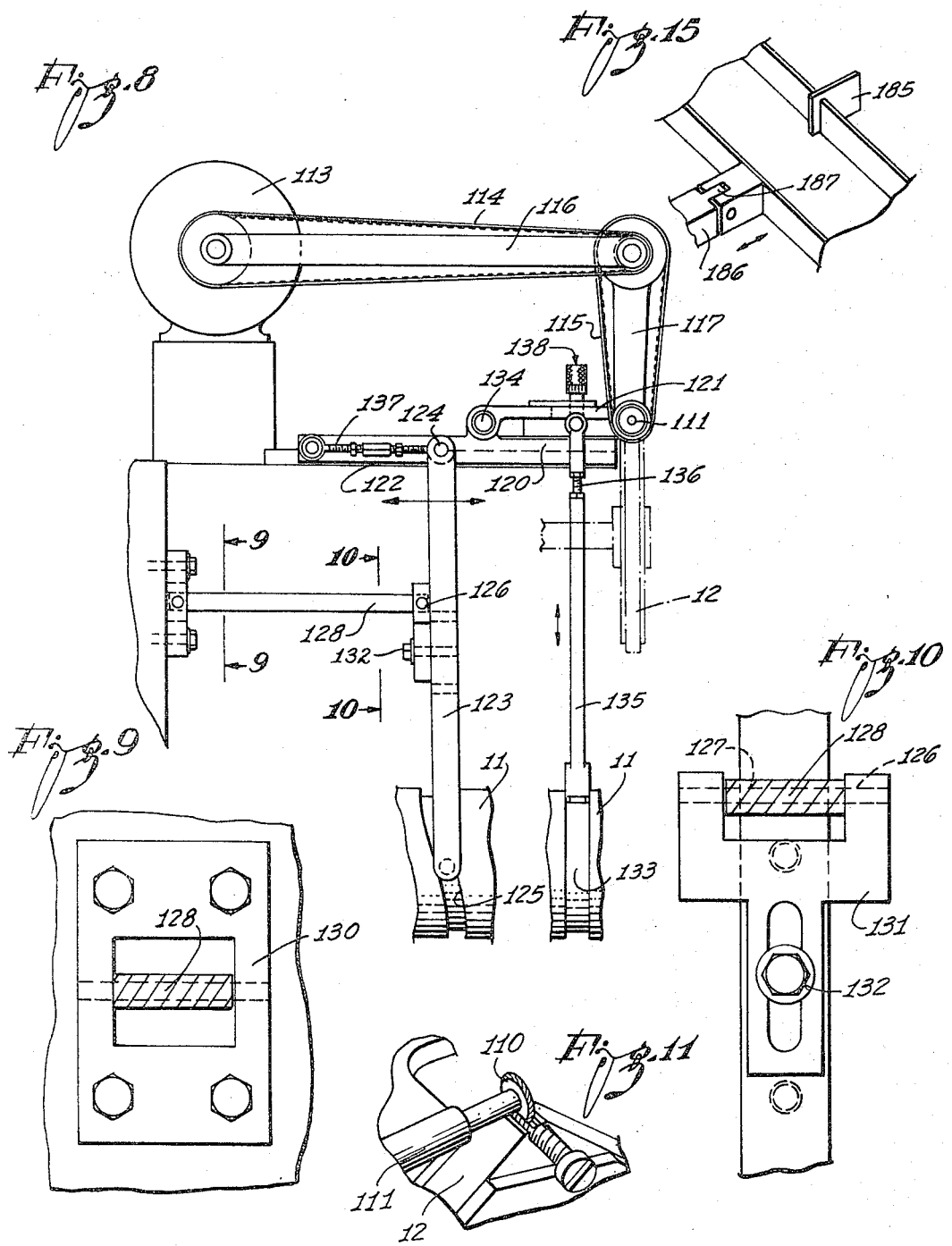

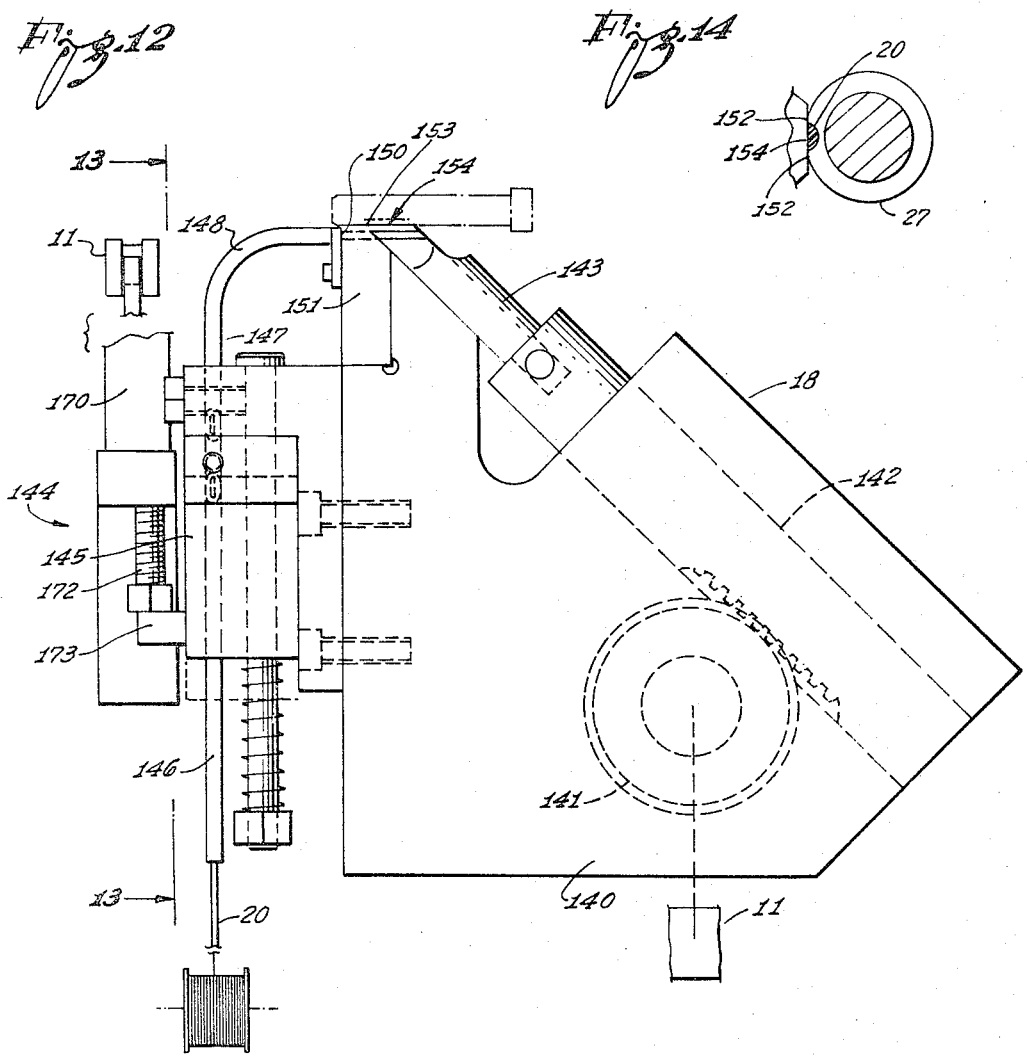
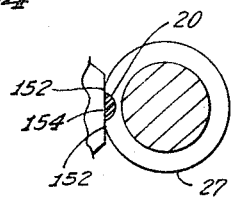
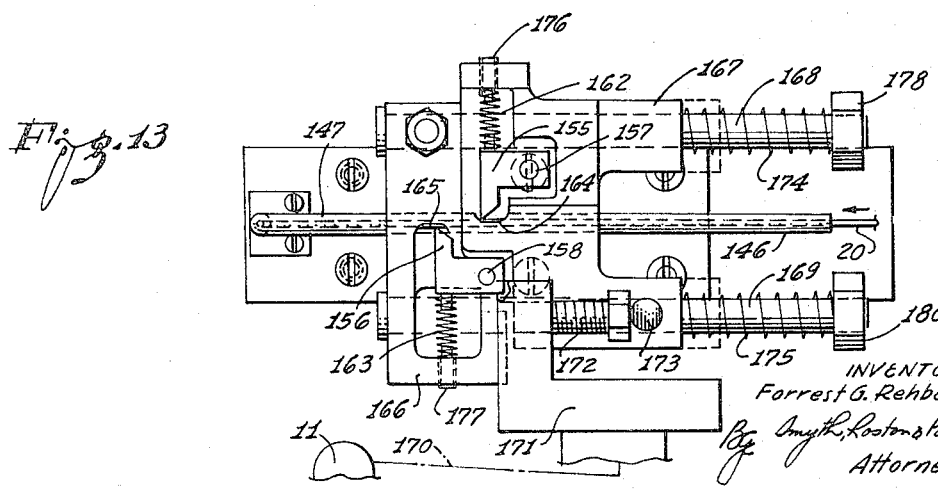

3,310,821
SELF-LOCKING FASTENER MACHINE
Forrest G. Rehberg, Monterey Park, Calif., assignor to Long-Lok Corporation, Los Angeles, Calif., a corporation of California
Filed July 1, 1964, Ser. No. 379,612
15 Claims. (Cl. 10—2)

This invention relates to a machine for automatically fabricating self-locking threaded fasteners of the type having a deformable plastic insert body in the threaded shank of the fastener resulting in a self-locking action when the fastener is inserted into a threaded bored body of, for example, a nut, and further relates to a method of fabricating such self-locking fasteners.

In one form of self-locking fasteners, a longitudinal cut or groove is made in the turns of the screw thread of the shank and the edges of the cut threads near the groove are peened or swaged to retain or anchor the deformable plastic body into the cut end fastener. Other self-locking fasteners have a longitudinal groove cut to a depth beyond the depth of the threads of the shank and the insert body is deformed or extruded into the threads so as to be retained therein with or without swaging. Examples of the type of self-locking fastener in which the plastic body is retained in the longitudinal groove without swaging are shown in the patent to T. L. McKay et al., No. 2,913,031, which issued on Nov. 17, 1959.

As aforesaid, the machine and method comprising this invention fabricate such fasteners automatically and all advantages thereof may be understood by reference to the following description and accompanying drawings, wherein:

FIGURE 1 is a semi-schematic, perspective, partial view of the automatic machine construction in accordance with this invention;

FIGURE 2 is an enlarged perspective view of a fastener of the self-locking type formed by the machine shown in FIGURE 1;

FIGURE 3 is a plan view of the rotatable dial assembly shown partially broken away to illustrate the fastener gripping elements;

FIGURE 4 is a plan view of the wrenches for operating the fastener gripping elements of the rotatable dial assembly, one of which wrenches is shown partially broken away to show the details thereof;

FIGURE 5 is an elevational, partially schematic view, illustrating the fastener feeding mechanism for feeding unfinished fasteners into the rotatable dial assembly gripping elements;

FIGURE 6 is a detail view taken along line 6—6 of FIGURE 5, looking in the direction of the arrows, and illustrating the escapement dial of the fastener feeding mechanism;

FIGURE 7 is a view taken along line 7—7 of FIGURE 5, showing the driving mechanism of the escapement dial illustrated in FIGURES 5 and 6;

FIGURE 8 is a semi-schematic elevational view of the cutting mechanism for cutting a longitudinal groove in the fastener;

FIGURE 9 is an elevational view taken along line 9—9 of FIGURE 8, looking in the direction of the arrows, and showing the pivot for one end of the link on the cutter actuating arm;

FIGURE 10 is a view taken along line 10—10 of FIGURE 8, looking in the direction of the arrows, and showing the pivot at the other end of the link for the cutter actuating arm;

FIGURE 11 is a semi-schematic perspective view illustrating in more detail the milling cutter of the cutting mechanism shown in FIGURE 8;

FIGURE 12 is a plan view of the guillotine mechanism for cutting and inserting the plastic insert into the fastener and swaging the fastener to grip the insert thereon;

FIGURE 13 is a view taken along line 13—13 of FIGURE 12 and looking in the direction of the arrows, partially broken away and showing the mechanism for moving the plastic insert material toward the guillotine for each successive fastener;

FIGURE 14 is a schematic view of the guillotine as it swages the insert material onto the fastener; and FIGURE 15 is a semi-schematic perspective view of the trough into which the finished fastener drops and a removal plate for forcing the fastener out of the gripping elements if one were to stick in the jaws.

Turning now to FIGURE 1, the automatic fastener machine is therein indicated in its entirety as 10 and comprises a plurality of cams 11 driven by a motor (not shown to simplify the disclosure), a rotatable dial assembly 12 on shaft 13, also driven by the motor through a Geneva movement (also not shown), which grips and transports unfinished fasteners, all of which fasteners, finished and unfinished, are indicated as 14, from a first station S–1 having a fastener feeding mechanism 15 thereat for feeding unfinished fasteners from a conveyor 16 to the dial assembly; to a cutting station S–2 having a cutting mechanism 17 thereat for cutting a groove in the unfinished fastener; to a third station S–3 having a guillotine and swager 18 thereat for cutting and inserting plastic insert material 20 from a spool 21 into the unfinished fastener and swaging the latter; and finally to a fourth station S–4 having a tray or trough 22 where the finished fasteners are released and conveyed by the tray 22 to a receptacle such as box 23. The Geneva movement causes the dial assembly 12 to stop or dwell after each quarter turn (90°) to permit the operation to be performed on the fastener at each staton. Actuators 24, later to be described in detail, actuated by the cam 11 operate the dial assembly 12 to grip and release the fasteners. The cam 11 though referred to simply as a cam, actually comprises many cams which function to operate the various components of the machine at timed sequences synchronized with the Geneva movement.

This machine forms a self-locking fastener such as 14 illustrated in FIGURE 2 having a head 26 and a shank 27 with a longitudinal groove 28 transverse of threads 30 and with a plastic insert 31 cut and pressed into the groove and with threads of the fastener and swaged to retain the insert therein. Inasmuch as the fasteners, per se, form no part of the present invention, no further description thereof is deemed necessary herein, except to say that the plastic material which may be used in the fastener made with the groove extending only part way through the depths of the threads, as previously described, may use the same elastic material as used in the fastener shown in the U.S. Patent No. 2,956,293 which issued to T. L. McKay et al. on Oct. 18, 1960, and wherein it states that such material may be various types of nylon and such plastics as those sold under the trade name Kel–F or where high temperature use of the fastener is contemplated the insert material may be of soft copper or stainless steel tubing.

*Rotatable dial assembly*

Turning now to FIGURE 3, where the rotatable dial assembly 12, which as previously described transports the unfinished fasteners 14 from station to station is shown in greater detail, it can be seen that this dial assembly 12 comprises a pair of relatively flat parallel plates 35 spaced apart to sandwich therebetween a center plate 36 having four gripping elements, each of which comprises a stationary paw member 37 and a movable jaw member 38 and an inner center plate 40.

Each stationary jaw member 37 is fastened to this center plate 40 by threaded bolts 41 to permit repair and replacement and aligned by alignment pin 42. Each jaw member 37 is also provided with an arcuate jaw proper 43 which receives the fastener at its threaded shank.

Each movable jaw member 38 pivots about a transverse pivot pin 44 by actuation of a cam 45 whose surface 46 contacts the movable jaw element 38 to move the latter toward the fixed jaw element 37 to grip a fastener 14 by its arcuate jaw proper 47 which complements jaw proper 43 and retains the same through the subsequent stations.

Each cam 45 has an extension 48 which forms a shaft shown extending on one side through plate 35 to fix the cam 45 for oscillation. Shaft 48 has an actuating pin 49 which extends generally parallel to the surface of plate 35 and is permitted to oscillate between two transverse stop pins 50 and 51 which form stops to limit the stroke of the cam 45.

Movable jaw element 38 is also provided with a spring 52 to maintain the jaw element 38 in working contact with the cam surface 46 and with a stop 53 in the form of a screw 54 to regulate the maximum opening of the jaws by stopping inward movement of the movable jaw element 38 under influence of the spring 52. This provides an adjustment independent of the stroke available to the jaw element by means of the cam 45.

From this description, it can be seen that an unfinished fastener placed in the jaws 43 and 47 at the first station S–1 will be gripped upon rotation of the cam 45 and effectively locked therein, and transported by the dial assembly mounted on shaft 13 in the main central aperture 56 counterclockwise in the direction of arrow 57 to the second station S–2, the cutting station, and thence to the third station S–3, the cutting, inserting and swaging station, and finally to the fourth station S–4, the release station. It is to be noted that the jaws remain closed at the second and third stations and are opened at the fourth station to be ready to receive a fastener at the first station.

Inasmuch as the cam actuating pins 49 are external of the plate 35 of the dial assembly, the actuators 24, previously referred to, which oscillate the cams 45 by acting upon the actuating pins 49, are also external of the dial assembly though they serve to open each successive gripping element when they reach station S–4 and close the opened gripping elements when they reach station S–1.

*Actuators for the gripping elements of the dial assembly*

Actuators 24, as more clearly shown in FIGURE 4, comprise a pair of wrenches 60 and 61, one of which will be described inasmuch as they are identical, but operate in different directions. Wrench 60 is mounted on a spindle or shaft 62 to oscillate axially extended, eccentrically mounted pin 63 as it engages cam actuating pin 49 (FIGURE 3) on the dial assembly 12 to rotate the cam 45 clockwise to open the gripping elements at station S–4 and to release the fastener. As will be apparent, concurrently, wrench 61 with its similar pin 63 engages a similar cam actuating pin 49 on the dial assembly 16 to close the gripping elements at station S–1.

One important feature of the instant wrenches is the fact that the torque imposed upon the cams 45 of the dial assembly is predetermined or limited by yielding means in the form of a spring so that any excessive resistance to the closing of the jaws at station S–1, as by the fastener being wrongly positioned therein, will not cause damage to the machine as by breaking the jaws or the wrenches. This torque limitation is accomplished in each wrench by providing the driving connection between a sleeve 64, which is fixed to shaft 62 by set screws 65, cooperating with holes 66 in shaft 62, and to which one end of helical spring 67 is attached at 68.

The other end of the helical spring 67 is attached to a radially disposed flange 69 in slot 70 of a second sleeve member 71 which is free to turn relative to the shaft 62. Pin 63, thus fixed to this latter sleeve member 71, is relatively independent of the shaft 62 and, as the shaft 62 is rotated, the tensioned helical spring 67 turns the pin 63 through the second sleeve member 71, and during normal operations, the torque imposed on actuating pin 49 is that induced by the spring 67; but if resistance were met by the pin 63, the spring would take up this excessive resistance by merely winding tighter rather than imposing additional torque on the pin 63, which would ordinarily occur where it not for this spring operative connection between the pin 63 and the shaft 61.

A radial pin 72 extends through a bore 73 in the second sleeve 71 and into a groove 74; the latter extending approximately 90° about the periphery of the shaft 61. The ends of the groove 74 in cooperation with pin 72 form a stop for sleeve 71 as it reacts to the tendency of the spring 67 to unwind and the groove is long enough so that if the sleeve 71 is stopped, as by meeting the aforesaid resistance, the pin 72 moves freely in the groove so that all the takeup is in the spring. The spring 67 can be wound tighter or unwound by simply removing the locking ring 75, pin 72 and turning the second sleeve one or more turns (360°) and reinserting the pin and locking ring; and torque adjustment is made by inserting a rod (not shown) into bore 76, removing the set screw 65 and rotating the sleeve 64 by the rod about the sleeve the desired amount and reinserting the set screw 65 into another hole. Holes 64 are spaced about the shaft for fine incremental torque adjustment. This torque adjustment permits the jaws to grip threads of soft material so that damage will not occur.

As previously mentioned, it is the oscillating movement of these wrenches 60 and 61 which impose the torque on the cams 45 of the dial assembly to open and close the gripping elements, and inasmuch as the dial assembly rotates but the wrenches remain relatively stationary, the wrenches must not only oscillate about their own axes, but move to and from the dial assembly at successive intervals so that their pins 63 are free of the cam actuating pins 49 as the dial assembly is rotating and in engagement with said cam actuating pins when the dial assembly stops.

To accomplish this, shaft 61 is longitudinally splined as at 77 to permit sliding movement relative to external gear 78 mounted for rotation on stationary mounting block 79. Gear 78, through its internal splines 80 and shaft splines 76 oscillates wrench 60, yet permits lateral movement therethrough. Shaft 62 has an enlarged head washer 81 affixed thereto by screw 82 and which contacts a shaft actuating pin 83 which, in turn, is connected to laterally movable bar 84. Bar 84 is moved laterally against the helical spring 85 operatively disposed between the stationary block 79 and first sleeve 64 affixed to the shaft by operation of cam 11 (FIGURE 1) to which it is connected by cam arm 86 (FIGURE 1). Such movement against the spring 85 is also the direction away from the dial assembly, and when the cam 11 permits, the force of the spring 85 will move the wrenches toward engagement with the rotatable dial assembly.

When wrench 60 is in the latter position, its pin 63 engages and rotates the pin 49 on the dial assembly to turn the cam 44 of the gripping element. The oscillatory movement of the wrench is accomplished through a gear train, indicated schematically at 88, by the rack 90 engaging with splines 91 of shaft 92. The reciprocation of the rack 90 is accomplished by the operation of the cams 11 to which the rack 90 is operatively attached through camming arm 93 which oscillates about its pivot 94 (FIGURE 1) to impart reciprocating movement to pivot 95 between the rack 91 and arm 93.

Thus, oscillatory movement is imparted to the shafts 62 of wrenches 60 and 61 through the rack and pinion arrangements 90 and 91 and transverse lateral movement is imparted to the wrenches through the bar 84.

When the dial assembly is in a position so that the jaws are ready to receive an unfinished fastener at station S–1 and to release a finished fastener at station S–4, the wrenches 60 and 61 are extended and oscillate in opposite directions to oscillate their respective pins 63 to open and close the jaws respectively, and once having accomplished this function, the wrenches 60 and 61 are withdrawn by the operation of the bar 84 to be free of the dial assembly so that it can rotate without interference to transmit the newly inserted fastener to station S–2 and the finished fastener from station S–3 to station S–4, at which time, the rack and pinion 91 and the helical springs 67 return the pins 63 to their initial position ready to again move toward and contact the pins 49 of the dial assembly for another operation. It is to be noted that the operation of cam 11 on the rack and pinion 90 and 91, respectively, and bar 84 is synchronized with the Geneva movement (not shown) to operate in timing sequence with the dial assembly 12.

*Feeding mechanism*

The feeding mechanism at station S–1 for feeding the fasteners into the dial assembly from a conveyor 16, as illustrated in FIGURES 5–7, inclusive, comprise an escapement dial 95 mounted for rotation on shaft 96 which, in turn, is driven by a spindle 97 through gears 98. The spindle 95 is actuated by and synchronized with the Geneva movement (not shown) which actuates the rotatable dial assembly 12 so as to be coordinated therewith inasmuch as the escapement dial 95 is arranged to receive an unfinished fastener from the conveyor 16 in one of its radial slots 99 when the latter is in its vertical position and transport the fastener periodically and incrementally counterclockwise to a horizontal position 90° from the vertical position and be at the latter position when the gripping elements of the dial assembly are ready to receive the fastener. The length of the slots 99 are such as to accommodate fasteners of different lengths, and stationary plates 100 are provided to maintain the fasteners in the slots 99 as the escapement dial rotates. At that particular time, a feeding plate 101 horizontally disposed and coplanar with the horizontally disposed unfinished fastener, the slot 99 and the jaws 43 and 47 of the dial assembly move horizontally toward the jaws by actuation of a camming arm 102. This camming arm 102 is pivotally connected at one end to the feeding plate 101 as illustrated at 103 and operatively connected at the other end to the cam 11 so as to pivot about pivot point 104 to effect horizontal sliding motion relative to stationary housing 105. It will be noted that the unfinished fasteners are properly oriented with their heads disposed so that they rest on the periphery 106 of the escapement dial by the conveyor 16 which is connected to a sorting mechanism (not shown) which serves to align and sort the unfinished fasteners so that they enter the conveyor 16 and are conveyed in a manner shown to the escapement dial. In the event that there is a misalignment of the unfinished fasteners or something to cause the unfinished fasteners to resist being inserted into the open jaws of the dial assembly, as for example, for some reason the jaws do not open, a safety switch 107 is provided which is connected to the motor driving the cam 11 to cut the source of power and thus prevent damage to the machine.

Another safety feature is an overload protector for the spindle 97 to prevent overloads imposed thereon and which comprises a series of spring-loaded balls 108 operatively connected to the aforesaid Geneva movement and which cooperate with detents 109 operatively connected to the spindle 97. Any overload will cause the spring-loaded balls to leave their initial detents and rotate freely until the machine is stopped or the overload corrected.

*Cutting mechanism*

After the unfinished fasteners leave station S–1 and are rotated to station S–2 by the dial assembly 12, a groove is cut longitudinally and transverse the threads of the fasteners, as previously mentioned.

FIGURES 8–11, inclusive, illustrate the cutting mechanism at station S–2 and, as shown schematically in FIGURE 11, a milling wheel 110 is rotated in the spindle 111 driven by motor 113 through belt drives 114 and 115. The spindle 111 is supported by a pair of support arms 116 and 117 pivotally connected to each other at 118 and movement of the milling wheel longitudinally to cut the groove in the fastener is accomplished by a pair of sliding blocks 120 and 121 connected to the spindle 111. Sliding blocks 120 and 121 reciprocate on a flat surface 122 of the machine by a reciprocating arm 123 pivotally connected at one end to sliding block 120 at 124 and at the other end to the cam 11 so that the camming surface 125 forces the pivot 124 backward and forward about its pivot 126 located substantially midway of the arm.

As illustrated in FIGURE 10, the pivot 126 comprises a pin 127 attached on one end of a connecting link 128 which, in turn, is connected at its other end to the housing of the machine, as more clearly illustrated in FIGURE 9 at 130. Adjustment of the stroke of the reciprocating arm, and consequently the stroke of the milling wheel, is accomplished by shifting the pivot point 126 by shifting the mounting bracket 131 along the arm 123, a bolt 132 being loosened for this purpose.

In FIGURE 11, the milling wheel 110 is in a position to cut the longitudinal groove into the fastener; however, inasmuch as the jaws of the dial assembly 12 extend radially outwardly beyond the edges of the fastener, a provision is made to move the spindle vertically at the time when the dial assembly is moving and this is accomplished by connecting sliding block 121 to the cam 11 so that its surface 133 moves the sliding block 121 upwards and downwards about its pivot 134 which connects sliding block 121 to sliding block 120 by operation of connecting link 135. The length of the link 135 and hence the height the milling wheel moves is accomplished by turnbuckle 136. In the same manner, the location of the horizontal stroke of the milling wheel is regulated by turnbuckle 137. It is apparent that the lifting movement and cutting stroke may be regulated as required to cut a groove in the fastener which does not extend the full length of the fastener, as clearly seen in FIGURE 2, and to adjust for different sizes of fasteners. Also, the depth of the groove made by the milling wheel 10 is adjusted by a calibrated set-screw mechanism 138 which serves to space the sliding block 121 from 120, thus raising or lowering the cutting wheel. It should be clear also that surfaces 125 and 133 on the cam 11 are coordinated with the Geneva movement of the dial assembly.

*Guillotine, feeder and swager*

At station S–3, as hereinabove mentioned, the fastener is provided with a plastic insert body which is inserted and swaged in the groove formed at station S–2. FIGURES 12 and 13 illustrate the guillotine 18 which comprises a housing 140 in which is disposed a pinion gear 141 to reciprocate a rack or plunger 142 within the housing so as to move guillotine blade 143 to and fro the fastener. A feeding mechanism 144 is provided which has its base 145 attached to the housing and into which is fed the plastic insert material 20 from the spool 21, the latter being previously referred to in FIGURE 1. The material enters a first feed tube 146 disposed in the base 145 and thence into a feed tube 147 curved as at 148 so as to have its discharge end 150 aligned parallel with the fastener axis. As the plastic material is fed through, it discharges past a shearing block 151 contiguous with the guillotine blade 143 so that, as the blade moves to and fro, it cuts the plastic material and inserts it into the groove of the fastener. Concurrently with this insertion, the edges or corners 152 of the threads of the fastener immediately adjacent the groove are swaged to hold the insert body in the fastener. One side and end 153 of the guillotine blade 143 cuts and inserts the material and the other diagonal side 154 serves as a swager, as more clearly illustrated in FIGURE 14. The slice made by the blade is diagonal which can correspond to the type of cut made by the milling wheel at station S–2 for ease of insertion of the material therein.

In order to move the plastic insert material to the guillotine blade, the feeding mechanism is provided with a pair of dogs 155 and 156, each of which respectively pivots about pins 157 and 158 and are urged into engagement with the insert material by gripper springs 162 and 163 through openings 164 and 165 in the feed tubes 146 and 147. One dog 156 is mounted on stationary block 166 attached to base 145. The slidable block 167 slides on a pair of rails 168 and 169 and has also fixed thereto the slidable feed tube 146 so that both the tube 146 and the dog 155 move together. The slidable block 167 reciprocates by operation of an actuating arm 170 actuated by the cam 11, as illustrated schematically in FIGURE 12. Actuating arm 170 is attached to an actuating bar 171 which has an adjusting screw 172 which engages an adjusting pin 173. Motivation of the bar 171 by the cam aforesaid causes the screw 172 to engage the adjusting pin 173 and move the sliding block 167 on the rails 168 and 169 in opposition to pairs of helical springs 174 and 175. When the cam 11 permits, the helical springs 168 and 169 urge the sliding block 167 to its original position, i.e., toward the stationary block 166. From the above description, it can be seen that the material 20 in the feed tubes 146 and 147 are engaged by the dogs 155 and 156, and at the selected time sequence, the sliding block 167 is moved against the springs 174 and 175; but, inasmuch as the plastic material is engaged by the dog 156, the material is held in place while dog 155 travels slidably on the plastic material when it again grips the material under influence of its gripper spring 162. In this position, when the cam permits the springs 174 and 175 to operate the sliding block 166, the plastic material, being gripped by the dog 155 overcomes the gripping action of the dog 156 and moves the plastic material toward the guillotine blade. At the end of the stroke of the sliding block, the dog 156 again grips the plastic material under influence of its gripper spring 163 for the next sequential operation.

The gripper springs 162 and 163 are provided with adjusting pins 176 and 177 to adjust the amount of gripping imposed on the material in the tubes 146 and 147 and helical springs 168 and 169 are adjustable by operation of adjusting nuts 178 and 180. The stroke of the slidable block 167, and hence the length of the material cut by the guillotine blade 143 is determined by the adjusting screw 172 and the cam 11, of course, synchronizes the operation of this feeding mechanism and the guillotine blade with the other operations of the machine.

*Ejector mechanism*

At station S–4, when the actuators 24 open the jaws as previously described in connection with FIGURES 3 and 4, the finished fastener normally drops onto the tray 22, as more clearly shown in FIGURES 1 and 15. Occasionally, however, the fastener may stick in the open jaws and to prevent this sticking finished fastener from being transported to station S–1 and causing a jamming of the machine, an ejector plate 185 is disposed transverse the tray 22 and arranged parallel the axis of the open jaws at station S–4. This ejector plate 185 is moved longitudinally by an actuating bar 186 coupled at one end to the tray as at 187 and at the other end to a cam actuating arm 188 (FIGURE 1) which, in turn, is pivoted at 189 to reciprocate thereabout by operation of the cam 11, more clearly shown in FIGURE 1. Thus, the surface 190 of the cam 11 engaging the actuating arm 188 moves the ejector plate 185 to a position free of the dial assembly to allow the latter to turn and in opposition to spring 191. At the time the spring elements reach their open condition at station S–4, spring 191 causes the ejector plate 185 to move toward the open jaws to eject any fastener therein. After this ejecting operation, the ejector plate is again returned to a position free of the dial assembly for the next operation. Like all other components of this machine, the cam 11 synchronizes the operation ejector mechanism in time sequences with all other operations.

Finally, turning to FIGURE 1 again, it is noted that the machine is provided with a handle 200 operably connected to the cam 11 to permit manual operation of the machine in the event that the main motor stops or in the event it is desired to operate the dial assembly through one or more sequences of operations to adjust the machine at any of its stations.

While any of the various components of the machine may have been described in a certain space relationship with respect to other components, these positions were used for the purposes of description only and do not in in any way limit the invention which is defined only by the claims which follow.

What is claimed is:

1. A machine for making a self-locking fastener, comprising:
    a feeder,
    a rotatable dial assembly including a plurality of gripping elements for receiving and gripping said fastener transferred from the feeder,
    actuation means for actuating said gripping elements to grip the fastener, said actuation means being movable toward and away from contact with said dial assembly to permit said dial assembly to rotate free thereof,
    means for rotating said dial assembly after gripping said fastener to transport said fastener to sequential operations in said machine,
    a cutter in said machine for making a longitudinal cut in said fastener,
    a guillotine and swager in said machine for inserting a plastic insert in the cut and to swage the fastener to anchor said plastic insert therein, and
    means for opening said gripping elements to release said fastener.

2. A machine for making a self-locking fastener, comprising:
    a feeder,
    a rotatable dial assembly including a plurality of gripping elements for receiving and gripping said fastener transferred from the feeder,
    means for rotating said dial assembly to transport said fastener to sequential operations in said machine,
    a cutter in said machine for making a longitudinal cut in said fastener,
    a combined guillotine and swager in said machine for inserting a plastic insert in the cut and in the same operation to swage the fastener to anchor said plastic insert therein, and
    actuation means for closing said gripping element to grip the fastener and for opening said gripping elements to release the fastener.

3. The machine claimed in claim 2 in which said actuation means is movable toward and away from contact with said dial assembly to permit said dial assembly to rotate free thereof.

4. A machine for making a self-locking fastener, comprising:
    a feeder including an escapement dial,
    a rotatable dial assembly including a plurality of gripping elements for receiving and gripping said fastener transferred from the feeder,
    said escapement dial orienting said fastener to be aligned with the gripping elements, actuating means for actuating said gripping elements to grip the fastener and movable toward and away from said dial assembly to permit the latter to rotate free thereof, a cutter in said machine for making a longitudinal cut in said fastener as it is held by said gripping elements, and a guillotine and swager in said machine for inserting a plastic insert in the cut and to swage the fastener to anchor said plastic insert therein as the fastener is held by the gripping elements, said actuating means for actuating said gripping elements also including means for releasing said fastener.

5. A machine for making a self-locking fastener, comprising:
a feeder,
a rotatable dial assembly including a plurality of gripping elements for receiving and gripping said fastener transferred from the feeder,
means for closing operation of said gripping elements to grip the fastener,
yielding means on the gripping elements for limiting the force said gripping elements impose on said fastener,
means for rotating said dial assembly after gripping said fastener to transport said fastener to sequential operations in said machine,
a cutter in said machine for making a longitudinal cut in said fastener, and
a combined guillotine and swager in said machine for inserting a plastic insert in the cut and in the same operation to swage the fastener to anchor said plastic insert therein,
said actuating means also including means for releasing said fastener.

6. The machine claimed in claim 5, wherein means are provided for regulating the length and depth of the cut made by said cutter.

7. The machine claimed in claim 5, wherein means are provided for regulating the guillotine so that the plastic insert corresponds in length to the length of the cut made by the cutter.

8. A machine for making a self-locking fastener, comprising:
a rotatable dial assembly having cam actuated jaws for receiving and gripping the fastener at a first station and transporting the fastener to a second, third and fourth station for timed sequential operation of forming a groove in said fastener, inserting a plastic insert in said groove and for releasing said fastener,
actuating means for actuating said jaws for gripping said fastener and for applying a predetermined torque to the jaws and for causing release of said fastener when the same reaches the fourth station, and
means for moving said actuating means toward and away from said dial assembly so that said dial assembly operates independently of said actuating means except at the first and fourth stations.

9. In a machine for making a self-locking fastener, comprising:
a dial assembly having a plurality of gripping elements for receiving and gripping said fastener to hold and transport said fastener through a plurality of sequential operations,
actuator means for actuating said gripping elements to grip and release the fastener,
means for intermittently rotating said gripping elements after gripping said fastener to transport said fastener to said sequential operations,
cam means in said dial assembly forming part of said gripping elements, and
means in said actuator means cooperating with said cam means for placing a predetermined amount of torque on said gripping elements.

10. The machine claimed in claim 9 in which the means of the actuator means for placing a predetermined amount of torque on said gripping elements comprises spring means.

11. The machine claimed in claim 9, wherein said actuating means engages said means for intermittently rotating said gripping elements when said rotating means is stopped and is free of said rotating means when said rotating means is moving.

12. A method for making a self-locking fastener, comprising the steps of:
gripping a threaded fastener,
cutting a longitudinal cut transverse of the threads of said fastener while gripped to a depth less than the depth of the threads,
inserting a plastic insert in said cut, and
swaging said fastener to anchor said plastic insert therein.

13. A method for making a self-locking fastener, comprising the steps of:
gripping a threaded fastener,
cutting a longitudinal cut transverse of the threads of said fastener to a depth less than the depth of the threads,
inserting a plastic insert in said cut, and swaging said threads adjacent said cut to anchor said plastic insert therein.

14. A method for making a self-locking fastener, comprising the steps of:
orienting a threaded fastener so as to have its head in one direction,
gripping said oriented fastener while oriented in one direction,
cutting a longitudinal cut transverse of the threads of said fastener while oriented and gripped to a depth less than the depth of the threads,
inserting a plastic insert in said cut, and
swaging said threads adjacent said cut to anchor said plastic insert therein.

15. A method for making a self-locking fastener, comprising the steps of:
orienting a threaded fastener so as to have its head in one direction,
gripping said oriented fastener,
transporting said fastener to a cutter for cutting a longitudinal cut transverse of the threads of said fastener to a depth less than the depth of the threads,
transporting said cut fastener to a guillotine and swager for cutting and inserting a plastic insert in said cut by said guillotine,
swaging the threads of said fastener to anchor said plastic insert therein, and
releasing said finished fastener from the gripping elements.

References Cited by the Examiner

UNITED STATES PATENTS

| 489,398 | 1/1893 | Towne | 77—64 |
|---|---|---|---|
| 2,185,351 | 1/1940 | Myers. | |
| 2,740,973 | 4/1956 | Borner et al. | 10—2 |
| 2,980,928 | 4/1961 | Wallace et al. | 10—2 |
| 3,020,570 | 2/1962 | Wallace et al. | 10—10 |
| 3,174,190 | 3/1965 | Wallace et al. | 10—10 |

ANDREW R. JUHASZ, *Primary Examiner.*